United States Patent [19]

Ainslie et al.

[11] Patent Number: 4,761,699
[45] Date of Patent: Aug. 2, 1988

[54] SLIDER-SUSPENSION ASSEMBLY AND METHOD FOR ATTACHING A SLIDER TO A SUSPENSION IN A DATA RECORDING DISK FILE

[75] Inventors: Norman G. Ainslie, San Jose; Dwight W. Brede, Los Altos Hills; A. David Erpelding; Surya Pattanaik, both of San Jose, all of Calif.

[73] Assignee: International Business Machines Corporation, Armonk, N.Y.

[21] Appl. No.: 923,932

[22] Filed: Oct. 28, 1986

[51] Int. Cl.$^4$ .................................................. G11B 5/60
[52] U.S. Cl. ..................................... 360/103; 29/603; 360/104
[58] Field of Search ............... 360/103, 104, 108, 128; 29/603

[56] References Cited

U.S. PATENT DOCUMENTS 3,564,522  2/1971  Stevens, Jr. .
4,462,534  7/1984  Bitaillou et al. .
4,546,541  10/1985  Reid .

FOREIGN PATENT DOCUMENTS 5084462   1/1977  Japan .
51104787  3/1978  Japan .
51144746  6/1978  Japan .
51151115  7/1978  Japan .

OTHER PUBLICATIONS

J. R. Reidenbach, "Combination Suspension-Lead cable for a Multi-Gap Read/Write Head", IBM Technical Disclosure Bulletin, vol. 22, No. 4 (Sep. 1979), pp. 1602–1603.
W. A. Warwick, "Multilayer Ceramic Slider for Thin-Film Heads", IBM Technical Disclosure Bulletin, vol. 15, No. 7 (Dec. 1972), pp. 2183–2184.
M. A. Church, et al., "Method for Wiring a Magnetic Head", IBM Technical Disclosure Bulletin, vol. 23, No. 8, (Jan. 1981), pp. 3873–3874.
R. B. Watrous, "Magnetic Head Suspension Assembly", IBM Technical Disclosure Bulletin, vol. 24, No. 10 (Mar. 1982), p. 4915.
B. R. Aimi, "Solder Reflow Pin Head to Chip Carrier Connection", IBM Technical Disclosure Bulletin, vol. 16, No. 8 (Jan. 1974), p. 2597.
E. N. Chase, et al., "Semiconductor Solder Reflow Chip Substrate Joining", IBM Technical Disclosure Bulletin, vol. 16, No. 8 (Jan. 1974), p. 2675.
B. R. Aimi, "Multi-Chip Carrier", IBM Technical Disclosure Bulletin, vol. 23, No. 5 (Oct. 1980), pp. 1833–1834.

Primary Examiner—A. J. Heinz
Attorney, Agent, or Firm—Thomas R. Berthold

[57] ABSTRACT

In a data disk file a slider is mechanically attached to the suspension by means of reflowed solder balls. A pattern of solder contact pads is formed on the back side of the slider and a similar pattern of solder-wettable regions is formed on the suspension. Solder balls are formed on either the solder contact pads or the solder-wettable regions, the slider is located on the suspension so that the solder balls are in registration between the solder contact pads and solder-wettable regions, and the solder is heated to reflow, thereby forming solder joints as a mechanical connection between the slider and suspension. When a thin film transducer is formed on the slider trailing edge and the suspension is a laminated type with patterned conductors, solder balls are also formed on the transducer lead terminations on the trailing edge and on a row of solder-wettable regions on the suspension near the location where the trailing edge of the slider is to be located. In this embodiment, when the slider with thin film transducer, with solder balls on the lead terminations, is located over the suspension then all of the solder balls are heated. The solder balls for providing mechanical connection collapse during reflow, thereby causing the solder balls on the transducer lead terminations to come in contact with and flow together with the solder balls formed on the row of solder-wettable regions on the suspension. Thus the mechanical attachment of the slider is made simultaneously with the electrical connection of the transducer lead to the disk file read/write electronics.

10 Claims, 4 Drawing Sheets

SLIDER-SUSPENSION ASSEMBLY AND METHOD FOR ATTACHING A SLIDER TO A SUSPENSION IN A DATA RECORDING DISK FILE

TECHNICAL FIELD

This invention relates to slider-suspension assemblies for data recording disk files and to a method for making such assemblies. In particular the invention relates to an improved slider-suspension assembly and to a method for mechanically and electrically attaching the slider to the suspension.

BACKGROUND OF THE INVENTION

Disk files are information storage devices which utilize at least one rotatable disk with concentric data tracks containing the information, a transducer (or "head") for reading data from or writing data to the various tracks, and a head positioning actuator connected to the head for moving it to the desired track and maintaining it over the track centerline during read or write operations. The transducer is attached to a slider having an air bearing surface which is supported adjacent the data surface of the disk by a cushion of air generated by the rotating disk. The slider is attached on its back side (the side opposite the air bearing surface) to the suspension, and the suspension is attached to a support arm of the head positioning actuator.

The suspension provides dimensional stability between the slider and actuator arm, controlled flexibility in pitch and roll motion of the slider relative to its direction of motion on the rotating disk, and resistance to yaw motion. The suspension typically provides a load or force against the slider which is compensated by the force of the air bearing between the slider's air bearing surface and the disk surface. Thus, the slider is maintained in extremely close proximity to, but out of contact with, the data surface of the disk. The suspension typically comprises a load beam, which is mounted at one end to the actuator arm, and a flexure element which is attached to the other end of the load beam and supports the slider. The load beam provides the resilient spring action which biases the slider toward the surface of the disk, while the flexure provides flexibility for the slider as the slider rides on the cushion of air between the air bearing surface and the rotating disk. Such a suspension is described in U.S. Pat. No. 4,167,765, which is assigned to the same assignee as this application. An example of a conventional slider is described in U.S. Pat. No. 3,823,416, which is assigned to the same assignee as this application.

In the conventional slider-suspension assemblies, the slider is mechanically attached to the flexure of the suspension by epoxy bonding. The electrical connection between the transducer and the disk file read/write electronics is made by twisted wires which run the length of the suspension load beam and extend over the flexure and slider. The ends of the wires are soldered or ultrasonically bonded to the transducer leads on the slider. The fabrication of such a slider-suspension requires manual assembly and is thus time consuming and costly.

Another type of suspension is a composite or laminated structure comprising a base layer with patterned electrical leads formed thereon and an insulating cover layer, as described in IBM Technical Disclosure Bulletin, Vol. 22, No. 4 (Sept. 1979), pp. 1602-1603 and Japanese Kokai Nos. 53-74414 (Jul. 1, 1978) and 53-30310 (Mar. 22, 1978). In the laminated suspension described in Japanese Kokai 53-74414, the slider is epoxy bonded to the laminated suspension and the transducer leads are soldered to the electrical leads formed on the suspension.

A disadvantage with conventional epoxy bonding of the slider to the suspension is that it is difficult to form the assembly such that the slider will have a predetermined pitch or roll relative to its direction of motion on the disk. Since the epoxy bonding can only result in a generally parallel relationship between the back side of the slider and the flexure of the suspension, the flexure must be formed or bent prior to bonding in order to give the slider a predetermined pitch or roll. Also, if it is desired to bond the slider to the suspension at a skew angle in order to optimize the angle between the slider's leading edge and the data track, some type of fixture is required to align the slider at the time the epoxy bond is formed.

An additional disadvantage with epoxy bonding is that because the epoxy is nonconductive, there is no consistent grounding path between the slider and the suspension. Thus in the event of static charge build-up on the slider the closest path for discharge is from the pole tips of the transducer to the disk surface. Static discharge through this path will destroy a thin film transducer.

Static charge build-up on the disk can also destroy a thin film transducer if the static discharge occurs from the disk to the pole tips of the transducer. This is because in conventional slider-suspension assemblies which have only one active thin film transducer on the slider, there is no grounding path from the pole tips of the inactive transducer.

SUMMARY OF THE INVENTION

The invention is an improved slider-suspension assembly in which the slider is mechanically attached to the suspension by a plurality of reflowed solder ball connections. When the suspension is the laminated type with patterned electrical leads, the electrical attachment of the transducer leads to the leads on the suspension is also provided by reflowed solder ball connections.

In the preferred embodiment a pattern of solder contact pads is provided on the back side of the slider and a like pattern of solder-wettable regions is provided on the generally planar portion of the suspension to which the slider is to be attached. Solder balls are then formed on either the slider solder contact pads or the solder-wettable regions by, for example, evaporation and subsequent reflow of the solder. The slider is then placed in contact with the suspension so that the solder contact pads are in approximate alignment with respective solder-wettable regions on the suspension and the solder balls are in registration between the two aligned patterns. The solder balls are then heated to reflow, thereby forming a mechanical connection with precise alignment between the slider and the suspension. The above-described solder reflow technique is similar to the controlled collapse chip connection (C4) process for securing semiconductor devices (chips) to printed circuit boards.

When the suspension is the laminated type and the transducer is the thin film type with leads formed on the slider trailing edge and terminating generally at the corner between the trailing edge and the slider back side, then solder connections between the transducer leads and electrical leads on the suspension are formed simultaneously with the above-described mechanical attachment. Solder balls are formed on the lead terminations of the thin film transducers and on a row of solder-wettable regions near the location where the trailing edge of the slider is to be located when the slider is attached to the suspension. The solder-wettable regions in the row are terminations for the electrical leads formed on the laminated suspension. When the slider is located on the suspension with the solder balls in registration between the two like patterns on the slider back side and the suspension, the solder balls on the transducer leads are then in alignment with but not in contact with the row of solder balls formed on the suspension. When the solder is heated, the solder balls between the back side of the slider and the suspension reflow and collapse, thereby causing the solder balls on the transducer leads to contact those formed in the row on the suspension. This results in the formation of generally right-angled solder joints between the transducer leads and the row of associated solder-wettable regions on the suspension.

The solder-wettable regions for providing mechanical attachment on the suspension are electrically grounded back to the actuator arm so that static charge on the slider will discharge to ground rather than to the disk through the transducer pole tips. In addition, the right-angled solder joints on the inactive thin film transducer end at solder-wettable regions which are electrically connected to certain of the solder-wettable regions for mechanical attachment. Thus, the pole tips of the inactive transducer are grounded through the slider back to the actuator arm so that static charge on the disk can be discharged through the pole tips of the inactive transducer.

The slider-suspension assembly is usable as a mechanical connection for both laminated type suspensions having patterned conductors and the more conventional suspensions, such as the stainless steel suspension described in the '765 patent. In the case of the conventional suspension, the solder-wettable regions are formed on the suspension by depositing solder-wettable material, such as copper, directly on the stainless steel. In the case of the laminated suspension, the regions are formed by providing openings through the insulating cover layer to expose portions of the conductive pattern.

Because orientation of the slider onto the suspension is determined by the pattern of solder contact pads, the slider can be reliably located on the suspension in a skewed position by merely orienting the solder contact pads at the time they are formed on the slider back side. Similarly, by altering the size of selected solder contact pads on the slider or the solder-wettable regions on the suspension, selected solder balls securing the slider to the suspension will form shorter solder joints during reflow. This permits the slider to be attached to the suspension with a predetermined pitch or roll orientation when the slider flies above the surface of the rotating disk.

For a fuller understanding of the nature and advantages of the present invention reference should be made to the following detailed description taken in conjunction with the accompanying drawings.

DESCRIPTION

A. Prior Art

Figure 1:
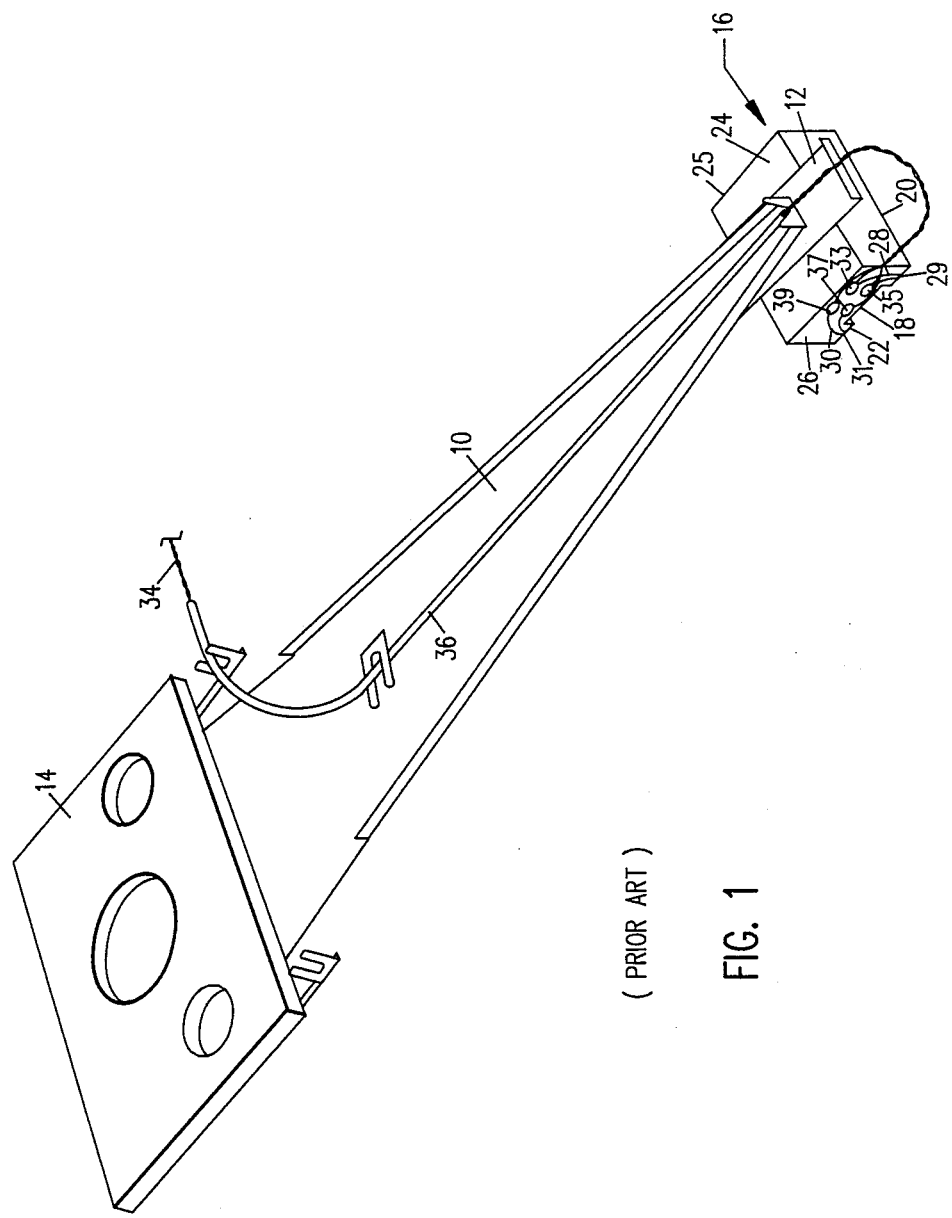
FIG. 1 is a perspective view of a conventional slider-suspension assembly illustrating mechanical attachment of the slider to the flexure of the suspension and twisted wire connection of the thin film transducer leads to the read/write electronics of the disk file.

A conventional slider-suspension assembly is illustrated in FIG. 1. The suspension comprises a load beam 10 and a flexure 12 located at the end of load beam 10. The suspension is attached to the disk file actuator arm (not shown) by means of a mounting plate 14. The slider 16 is a conventional slider formed of ceramic material, such as a mixture of alumina ($Al_2O_3$) and titanium carbide (TiC). The slider 16 has an air bearing surface 18, which includes two rails 20, 22, a back side 24 opposite and generally parallel to air bearing surface 18, a leading edge 25 and a trailing edge 26, both of which form end faces oriented generally perpendicular to air bearing surface 18 and back side 24. Slider 16 is secured to flexure 12 by an epoxy bond between back side 24 and flexure 12.

Located on the trailing edge 26 of slider 16 are two thin film read/write transducers 28, 30. Typically, multiple thin film transducers are formed on a single slider, even though only one transducer is active as a read/write element, in order to improve the yield of the slider during the thin film fabrication process. The transducers 28, 30 have pole tips 29, 31, respectively, which extend toward the edge of respective rails 20, 22. Transducer 28 has electrical leads 33, 35 and transducer 30 electrical leads 37, 39 for connection to the read/write electronics of the disk file.

The epoxy connection between flexure 12 and the back side 24 of slider 16 does not provide electrical grounding. Thus any static charge on slider 16 can only be dissipated through the pole tips 29 of active transducer 28 to the disk surface, which results in destruction of the thin film transducer.

In the conventional embodiment shown in FIG. 1, the electrical attachment to the read/write electronics is made by twisted wires 34 which extend from the read/write electronics, through a tube 36 on load beam 10 and out the end of tube 36. The ends of wires 34 are soldered or ultrasonically bonded to the leads 33, 35 of active transducer 28. The electrical connection of the transducer 28 by means of the twisted wires 34 is made by manual fabrication.

B. Preferred Embodiments

Figure 2:
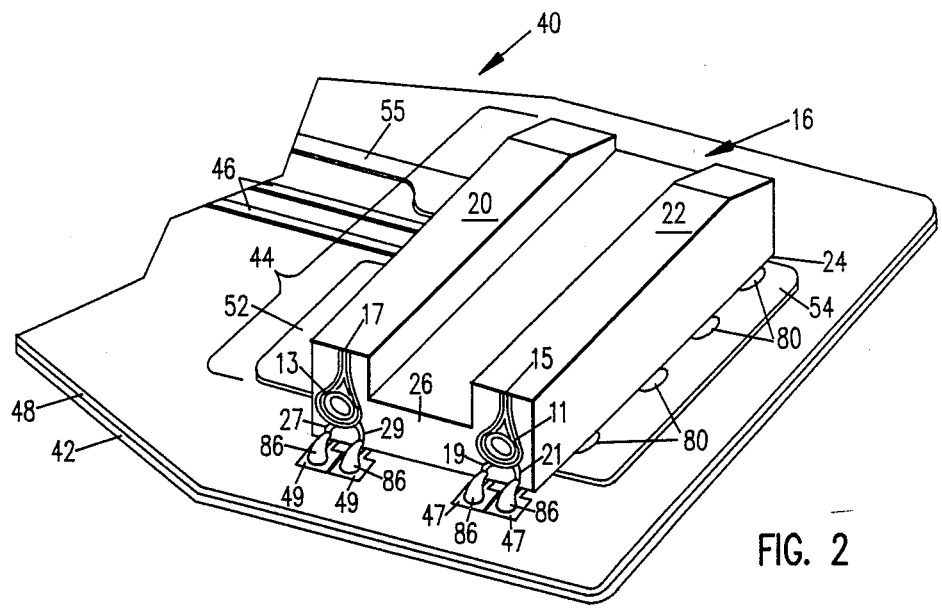
FIG. 2 is a perspective view of the slider-suspension assembly according to the present invention illustrating a laminated suspension with the slider mechanically attached by reflowed solder balls to a portion of the patterned conductive layer and the thin film transducer leads electrically connected by right-angled solder joints to electrical leads on the patterned conductive layer.

Referring now to FIG. 2, the slider-suspension assembly of the present invention is illustrated as slider 16 which is both mechanically and electrically connected to a composite or laminated suspension 40. The suspension 40 comprises a nonconductive base layer 42, a patterned conductive layer 44, and an insulating cover layer 48. The base layer 42 may be a polyimide sheet and the patterned conductive layer 44 a vapor-deposited copper film. The insulating cover layer 48 may be a layer of polyimide formed over the patterned conductive layer 44 and bonded to the base layer 42. The patterned conductive layer 44 is thus formed between base layer 42 and cover layer 48 and is visible in FIG. 2 because of the translucency of cover layer 48. The electrical leads 46 form part of the conductive layer 44 and extend beneath the slider 16 where they end at terminations 47.

The conductive pattern of layer 44 is better illustrated in FIG. 3 and includes electrical leads 46 with terminations 47, and large area portions 52, 54 which form a supporting base for the mechanical attachment of the slider in the manner to be described below.

The slider 16 (FIG. 2) has an air bearing surface 18, including rails 20, 22, and a trailing edge 26. Conventional thin film transducers 11, 13 are formed on the trailing edge with respective pole tips 15, 17 extending to the edges of rails 20, 22 respectively. Each of transducers 11, 13 has a pair of electrical leads 19, 21 and 27, 29, respectively, extending across the trailing edge 26 toward the corner formed by back side 24 and trailing edge 26. As shown in FIG. 2, slider 16 is mechanically bonded to the large area portions 52, 54 of conductive pattern 44 by means of reflowed solder balls 60 between the slider back side 24 and the conductive layer 44. Transducer 11 is the active transducer and electrical connection of it to the terminations 47 formed as part of the conductive pattern 44 is made through generally right-angled solder joints 86. The leads 27, 29 of inactive transducer 13 are connected to extensions 49 of portion 52 of the conductive pattern 44.

Figure 3:
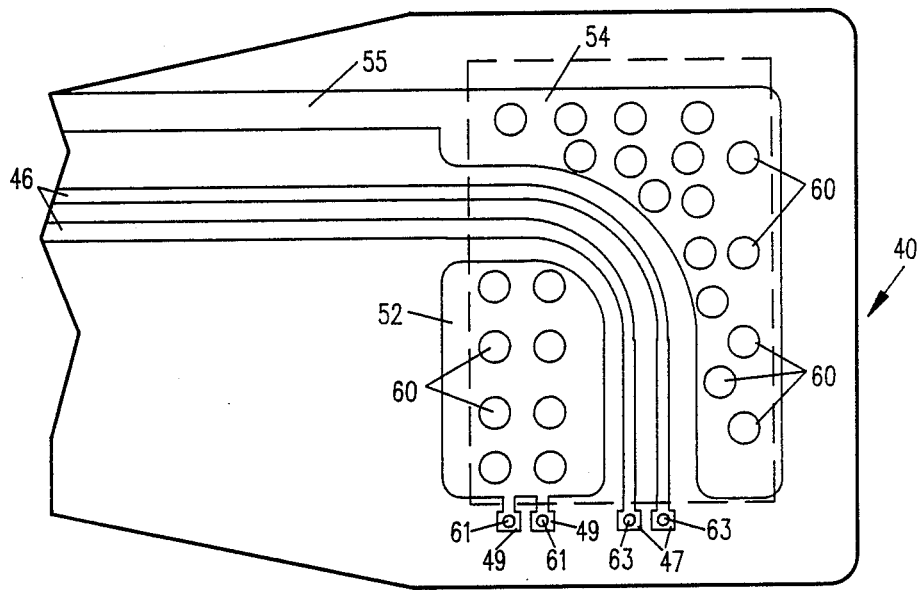
FIG. 3 is a plan view of the suspension shown in FIG. 2, with the slider outline shown in dashed line, illustrating the patterned conductive layer and the solder-wettable regions thereon for receiving the solder balls for both mechanical and electrical connection to the slider.

The circles shown on FIG. 3 are circular openings 60, 61 and 63 in the insulating cover layer 48 which expose the underlying copper of the patterned conductive layer 44. Circular openings 60 define a pattern of solder-wettable regions on suspension 40 for mechanical attachment of slider 16. Circular openings 61, 63 define a row of solder-wettable regions along the line where the transducer lead terminations will be located when the slider is attached to the suspension. The solder-wettable regions 63 are used for electrical connection of leads 46 to transducers 11.

Figure 4:
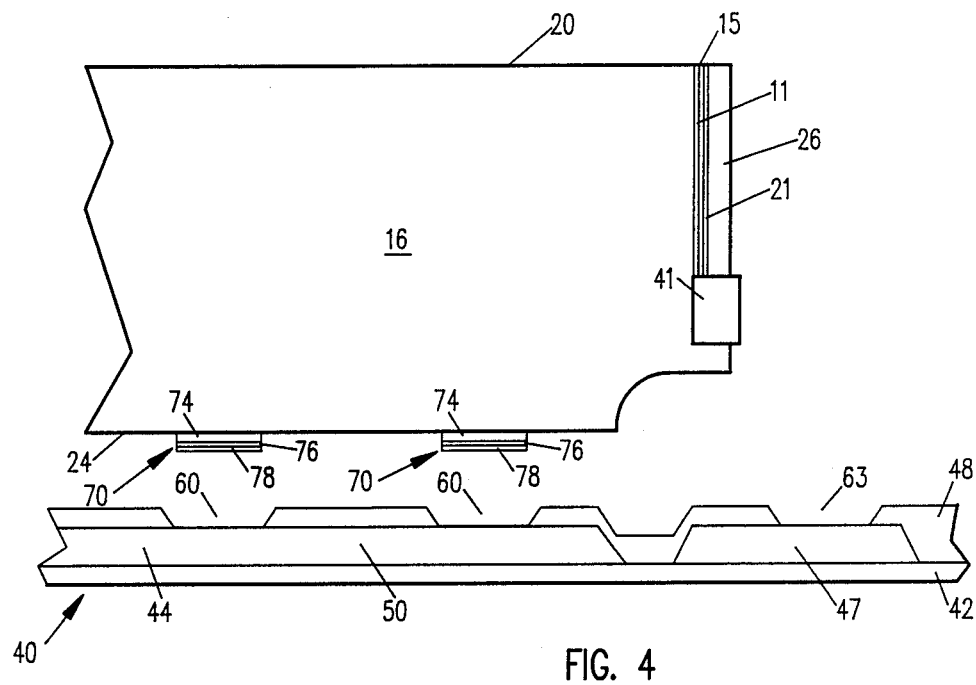
FIG. 4 is a view of a portion of a slider and suspension without the solder ball connections, and illustrating representative solder contact pads on the slider back side and solder-wettable regions on the laminated suspension.
Figure 5:
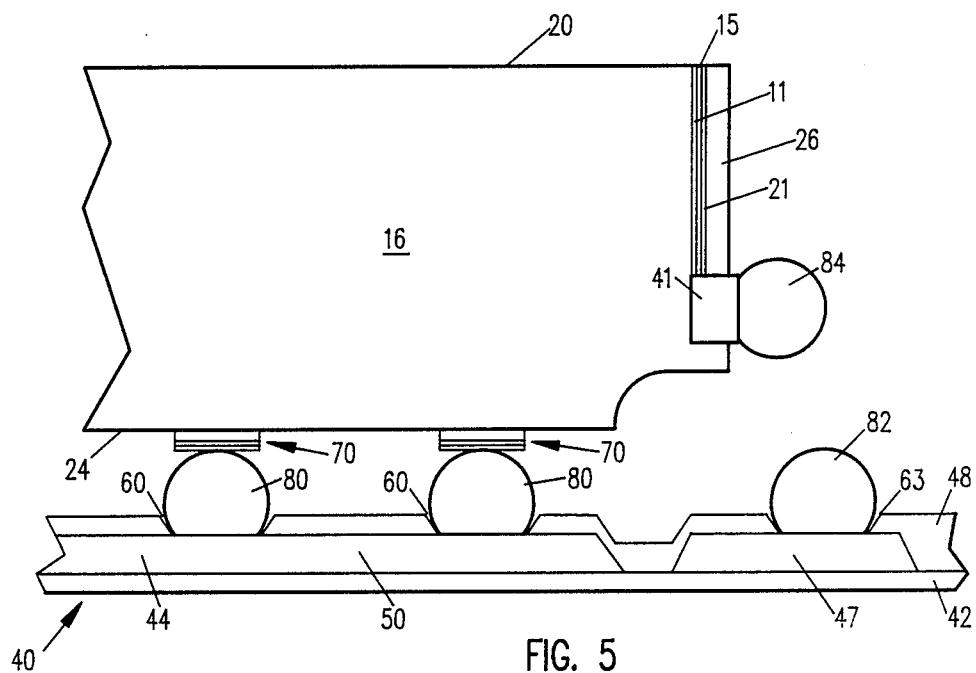
FIG. 5 is a view of a portion of a slider and suspension illustrating solder balls formed on the suspension and on the transducer leads prior to reflow of the solder.
Figure 6:
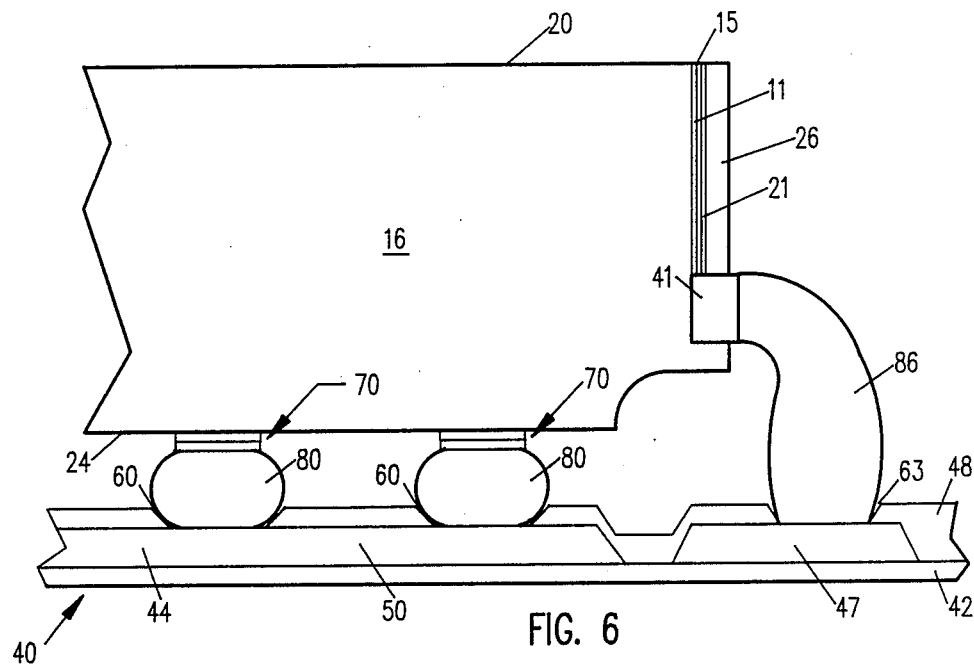
FIG. 6 is a view of a portion of the completed slider-suspension assembly illustrating the reflowed solder balls providing mechanical connection between the slider back side and the suspension, and the generally right-angled solder joints providing electrical connection between the transducer leads and the electrical leads on the suspension.

The manner in which the solder connection of slider 16 is made to suspension 40 can be better understood by reference to FIGS. 4, 5, and 6. FIG. 4 illustrates a portion of slider 16 with solder contact pads 70 formed on the back side 24 and solder-wettable regions 60, 63 formed on suspension 40. The solder-wettable regions 63, one of which is shown in FIG. 4, are formed on the terminations 47 of leads 46 (Fig. 3). The pattern of solder contact pads 70 formed on the back side 24 of slider 16, only two of which are shown in FIG. 4, is a mirror image of the pattern of solder-wettable regions 60 on portions 52, 54 (FIG. 3). Also shown in FIG. 4 is the slider trailing edge 26 with transducer 11 formed thereon, and transducer pole tips 15, lead 21 and lead termination 41.

As shown in FIG. 4, each of the contact pads 70 comprises an adhesion film 74 formed directly onto the slider back side 24 and a solder-wettable film 76 formed on the adhesion film 74. The solder contact pads are formed on the slider back side by a suitable mask having openings which is placed over back side 24. The masked slider is then placed in an evaporation dome and a crucible containing the adhesion material, such as titanium, is evaporated and formed as film 74 on the slider back side 24. Thereafter the solder-wettable film, such as nickel, is evaporated onto the adhesion film. It is preferable that for a short period of time the evaporation of both the titanium and the nickel occur so that an interfacial alloy of titanium and nickel is formed between the adhesion film 74 and the solder-wettable film 76. If the solder balls are not to be formed for some time, then a corrosion-resistant film 78 of, for example, gold is formed over the nickel film. The gold film provides a corrosion barrier for the solder contact pads 70. The solder contact pads 70 formed in this manner provide material which is conductive to the wetting or adhesion of solder and thus permit solder balls to be securely adhered to the back side 24 of slider 16. Chromium may be used in place of titanium as the adhesion film, and copper may be used in place of nickel as the solder-wettable film.

Referring again to FIG. 3, the solder-wettable regions on suspension 40 are formed by removing selected portions of the polyimide insulating layer 48, which thereby exposes the circular openings 60, 61 on large area portions 52, 54 and the circular openings 63 on lead terminations 47. These openings in the polyimide layer are preferably formed by the use of a conventional mask having the pattern of circles. The polyimide is then etched away to expose the underlying copper material, as best shown in FIG. 4.

Referring now to FIG. 5, solder balls 80 are formed on the solder-wettable regions 60 and solder balls 82 are formed on solder-wettable regions 61, 63. The solder balls are preferably formed by first tightly securing a mask with circular openings over the suspension, the openings being aligned with the etched-away portions of layer 48. A solder paste is then spread over the mask and forced through the openings. The mask is removed and the solder heated to reflow as solder balls 80, 82. The solder balls are then adhered to the regions 60, 61 and 63 of the patterned conductive layer 44. The solder balls 80, 82 may also be formed on the suspension by evaporating solder through openings in a mask placed over insulating layer 48, removing the mask and thereafter heating the evaporated solder to cause the solder to reflow as solder balls 80, 82.

FIG. 5 also illustrates solder balls 84 formed on transducer lead terminations 41. The solder balls 84 are formed on all of the thin film transducers at the wafer level during fabrication of the thin film transducers by evaporating solder through a mask placed over the wafer before the wafer is cut into the individual sliders. FIG. 5 thus illustrates an intermediate step in the method for simultaneously mechanically and electrically attaching the slider to the suspension. During this step the slider 16 is located on solder balls 80 with the solder balls 80 being in registration between solder contact pads 70 and solder-wettable regions 60. Solder balls 84 on the slider trailing edge 26 are aligned with but out of contact with the corresponding row of solder balls 82 on the suspension. With the slider supported in this position heat is then applied to all of the solder balls. This causes solder balls 80 to collapse, thereby permitting solder balls 82, 84 to come into contact and flow together to form generally right-angled solder joints 86 for providing the required electrical connection between transducer 11 and leads 46. The right-angle joints 86 formed on inactive transducer 13 provide electrical connection to conductive portion 52 and thus to slider 16.

The completed slider-suspension assembly is illustrated in FIG. 6, which shows the collapsed solder balls 80 and the joined solder balls 82, 84 forming the right angled solder joints 86. When the solder has cooled and solidified the slider is both mechanically attached to the suspension and the transducer leads 19, 21 are electrically connected to the electrical leads 46 formed on the suspension. Because the slider 16 is mechanically attached to the conductive layer 44 by the electrically conductive solder balls 80, an electrical path is provided for static discharge from the slider 16, thereby preventing destruction of transducer 11 caused by discharge through the pole tip 15 to the disk surface. As shown in FIG. 3, the area 54 of conductive layer 44 includes a ground lead portion 55 which extends back for grounding connection to the actuator arm (not shown). The right-angled solder joints 86 on inactive transducer 13 (FIG. 2) provide electrical connection from pole tips 17 to extensions 49 on conductive portion 52 and the reflowed solder balls 80 on portion 52. Conductive portion 52 in turn is electrically connected to slider 16 by reflowed solder balls 80, and slider 16 is grounded by path 55 to the actuator arm (not shown). Thus any static charge on the disk will be discharged to ground through the pole tips 17 of inactive transducer 13, thereby avoiding the destruction of active transducer 11.

In the embodiment as just described the solder balls 80 are first formed onto the solder-wettable regions 60, 61 and 63 of the suspension 40. The solder balls 80 could instead be first formed onto the solder contact pads 70 on the slider 16. In addition, rather than spreading solder paste through a mask or evaporating solder through a mask onto either the slider back side 24 or the suspension 40, it is also possible to spread commercially available performed solder balls over a mask to locate the solder balls through openings in the mask and then heat the performed solder balls. The solder balls would then be formed and adhered to either the slider back side or the suspension and the mask would then be removed.

It is within the scope of the present invention to provide mechanical attachment of the slider 16 directly to a conventional stainless steel flexure, such as that described in the '765 patent, provided solder-wettable regions are first formed on the stainless steel flexure. This may be accomplished by any known method of forming, on the stainless steel, metal films which are adherent to solder, and thereafter evporating or otherwise forming solder onto the metal films formed on the stainless steel flexure. For example, the pattern of solder-wettable regions 60 could be formed on a stainless steel flexure by electroplating copper. If the slider is mechanically attached to the stainless steel suspension in this manner, then the electrical connection of the transducer can be made through the use of conventional twisted wires as previously described.

Figure 7:
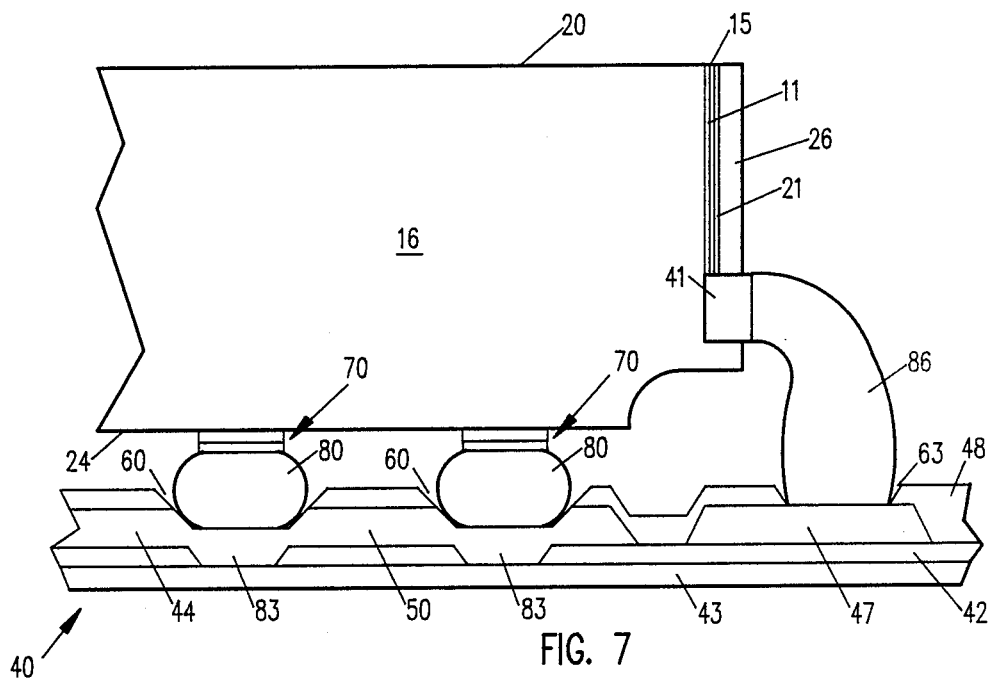
FIG. 7 is an illustration of the slider-suspension assembly with a laminated suspension having a stainless steel supporting layer.

Referring now to FIG. 7, there is illustrated the identical invention with the exception that the composite suspension 40 now includes an underlying support layer 43, which may be a stainless steel flexure, onto which the base layer 42 is adhered. Portions of nonconductive base layer 42 are etched away in the areas 83 where solder balls 80 are to be aligned. Thus, when the copper layer 44 is formed it is placed in direct contact with stainless steel in the areas 83. This allows solder balls 80 to form both a mechanical connection and an electrical grounding path to the stainless steel support layer 43.

In all of the embodiments shown and described the solder may be any type with a melting point compatible with the other materials used in the slider-suspension assembly. For example, eutectic tin-bismuth (SnBi) or eutectic tin-lead (SnPb) solder is acceptable.

Referring again to FIGS. 2 and 3, it should be apparent that if the pattern of solder contact pads 70 formed on back side 24 of slider 16 is skewed relative to the slider, which is represented by dashed lines in FIG. 3, then the slider can be mounted to the suspension in a skewed manner. This may be desirable when the slider-suspension assembly is used on smaller diameter disk files or on disk files with rotary actuators, where it may be desirable to optimize the yaw angle of the slider relative to the data tracks.

It is only necessary that the slider contact pads be approximately aligned with their corresponding solder-wettable regions prior to reflow. During reflow the solder balls will be wetted to both the contact pads and the corresponding solder-wettable regions and will cause the slider to be precisely aligned on the suspension. The solder balls used to mechanically attach the slider result in the slider back side and suspension being generally parallel because any variations in size among solder balls is averaged out by the relatively large number of solder balls used. If, however, certain of the circular slider solder contact pads and/or suspension solder-wettable regions are formed so as to have a larger diameter than others in the patterns, but the mask used to form the solder on those selected pads or regions has openings all of the same diameter, then a larger portion of each of the solder balls that is formed on those selected pads or regions during reflow will be wetted to those pads or regions. This will result in a shorter solder joint at those selected pads or regions. This will permit the slider to be mechanically attached to the suspension so as to be slightly nonparallel to the planar suspension, because those solder balls formed on larger diameter pads and/or regions will form shorter joints when reflowed. For example, with reference to FIG. 7, if the solder contact pads and associated suspension solder-wettable regions near the leading edge (not shown in FIG. 7) of the slider have a larger diameter than those shown near the trailing edge 26 in FIG. 7, then the slider would be slightly tilted with respect to the suspension so that the slider will fly with a slight negative pitch attitude. Thus, with the present invention the slider may be mounted to the suspension with a slight pitch or roll, thereby eliminating the need to preform the flexure.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A slider-suspension assembly for a data recording disk file comprising:
    a slider having an air bearing surface, a back side opposite the air bearing surface and a trailing edge oriented generally perpendicular to the back side and air bearing surface;
    a plurality of solder contact pads formed on the back side of the slider;
    a transducer formed as a thin film on the trailing edge of the slider and having electrical leads formed on the trailing edge and terminating approximately at the corner defined by the back side and trailing edge;
    a suspension formed as a laminated structure comprising a nonconductive base layer, a patterned conductive layer formed on the base layer and having a portion providing electrical connection to ground, and an insulating layer formed over the patterned conductive layer and having openings therein exposing solder-wettable regions on the conductive layer, at least some of said regions on the conductive layer being oriented in registration with corresponding solder contact pads on the back side of the slider;
    a plurality of reflowed solder balls, each solder ball mechanically connecting a solder contact pad on the slider with a respective solder-wettable region on the conductive layer and maintaining the back side of the slider spaced from and out of contact with the insulating layer, at least one of the solder balls electrically connecting a solder contact pad on the slider with said conductive layer portion providing electrical connection to ground; and
    a plurality of generally right-angled reflowed solder joints, each joint spanning the space between the slider back side and the insulating cover layer and connecting a transducer lead termination to an associated solder-wettable region not in registration with a solder contact pad.

2. The slider-suspension assembly according to claim 1 wherein the suspension includes a stainless steel layer secured to the nonconductive base layer.

3. The slider-suspension assembly according to claim 1 wherein the diameter of a portion of either the solder contact pads or the solder-wettable regions in registration with the solder contact pads is different than the diameter of the remaining solder contact pads or solder-wettable regions, whereby the slider is joined to the suspension conductive layer with its back side slightly nonparallel to the suspension conductive layer.

4. The slider-suspension assembly according to claim 1 further comprising a second like transducer formed on the slider trailing edge, wherein the plurality of generally right-angled reflowed solder joints includes joints connecting the second transducer lead terminations to associated solder-wettable regions not in registration with solder contact pads and wherein the solder-wettable regions joined to said second transducer are located on a portion of the conductive layer which also contains reflowed solder balls connecting said conductive layer portion to the slider, whereby said second transducer is electrically connected to the slider and thereby to ground so as to be rendered inactive.

5. A method for connecting a slider to a suspension wherein the suspension is a laminated structure having a nonconductive base layer, a patterned conductive layer formed on the base layer and having a portion for electrical connection to ground, and an insulating cover layer formed over the patterned conductive layer, the method comprising the steps of:
    forming on the generally planar back side of the slider a plurality of solder contact pads;
    forming openings in the insulating cover layer of the suspension so as to expose a like plurality of solder-wettable regions on the conductive layer;
    forming solder balls on each of either the solder contact pads on the slider or the solder-wettable regions on said suspension conductive layer;
    locating the slider back side adjacent said suspension such that the solder contact pads are in approximate alignment with corresponding solder-wettable regions and the solder balls are in registration with and located between the solder contact pads and the corresponding solder-wettable regions; and
    heating the solder balls so as to reflow the solder and thereby mechanically join the slider to the suspension and electrically connect the slider to said conductive layer portion for electrical connection to ground.

6. The method according to claim 5 wherein the step of forming the solder contact pads comprises locating a mask having a plurality of openings over the slider back side, evaporating a first adhesion film onto the slider back side through the mask openings and evaporating a solder-wettable film onto the adhesion film through the mask openings.

7. The method according to claim 6 wherein the step of forming the solder balls comprises the steps of either evaporating a solder film onto the solder-wettable film through the mask openings or spreading solder paste onto the solder-wettable film through the mask openings, removing the mask and thereafter heating the solder film so as to form solder balls adhered to the solder contact pads.

8. The method according to claim 6 wherein the step of forming the solder balls comprises the steps of locating a mask having openings therein over said suspension so as to align the openings in the mask with the openings in the suspension insulating cover layer, either evaporating solder or spreading solder paste through the mask openings so as to form a solder film onto the solder-wettable regions of said suspension conductive layer, removing the mask and thereafter heating the solder film so as to form solder balls adhered to the solder-wettable regions of said suspension conductive layer.

9. The method according to claim 5 wherein the slider is the type having a thin film transducer formed on its trailing edge, the thin film transducer having electrical leads formed on the trailing edge and terminating generally at the junction of the trailing edge and slider back side, and wherein the patterned conductive layer on the suspension includes electrical leads for connection with the transducer, the method further comprising the steps of:

- forming solder balls on the transducer lead terminations;
- providing on the suspension proximate the location for the trailing edge of the slider a second plurality of solder-wettable regions, at least a portion of said second solder-wettable regions being connected to an electrical lead on the patterned conductive layer;
- forming solder balls on said second plurality of solder-wettable regions; and
- while heating the solder balls located between the slider back side and said suspension portion, heating the solder balls on the transducer lead terminations and associated second plurality of solder-wettable regions on the suspension to thereby form generally right-angled electrical solder joints between the thin film transducer on the slider and the electrical leads on the suspension.

10. A method for the fabrication of a data recording disk file slider-suspension assembly, the slider being of the type having an air bearing surface, a back side opposite the air bearing surface and a trailing edge having a read or write transducer formed as a thin film thereon with electrical leads formed solely on the trailing edge and terminating adjacent the slider back side, and suspension being a laminate of a nonconductive base layer, a patterned conductive layer including electrical leads formed on the base layer and an insulating cover layer formed over the patterned conductive layer, the method comprising the steps of:

- forming a pattern of solder contact pads on the back side of the slider;
- removing portions of the insulating cover layer from the suspension so as to expose both a pattern of solder-wettable regions corresponding to the pattern of solder contact pads on the slider back side and a row of solder-wettable regions adjacent to and spaced from the pattern of solder-wettable regions;
- forming a solder ball on each of the solder-wettable regions on the suspension;
- forming a solder ball on each of the transducer lead terminations on the trailing edge of the slider;
- locating the slider adjacent the suspension such that the solder balls formed on the pattern of solder-wettable regions on the suspension are in contact with the pattern of solder contact pads on the back side of the slider and the solder balls formed on the row of solder-wettable regions on the suspension are in alignment with but slightly spaced from the solder balls on the transducer lead terminations; and
- heating all of the solder balls so as to cause the solder balls in contact with the contact pads on the slider back side to collapse and thereby bring the solder balls on the transducer lead terminations into contact with the solder balls in the row of solder-wettable regions on the suspension, whereby the mechanical attachment of the slider to the suspension is made simultaneously with the electrical connection of the transducer to the electrical leads on the suspension.

* * * * *